US011023098B2

(12) United States Patent
Mak et al.

(10) Patent No.: US 11,023,098 B2
(45) Date of Patent: Jun. 1, 2021

(54) RENDERING ON A MOBILE DEVICE

(71) Applicant: SAP SE, Walldorf (DE)

(72) Inventors: Walter Mak, North Vancouver (CA);
Steffen Koette, Vancouver (CA); Tsz Hong Sung, Richmond (CA); Yahui Ke, Vancouver (CA); Nathan Wang, Port Coquitlam (CA); Sanam Narula, Vancouver (CA); Shou-Chieh Chao, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/151,183

(22) Filed: Oct. 3, 2018

(65) Prior Publication Data

US 2020/0110528 A1 Apr. 9, 2020

(51) Int. Cl.
*G06F 3/0481* (2013.01)
*G06F 3/0482* (2013.01)
*G06T 15/00* (2011.01)
*G06F 3/0485* (2013.01)
*G06F 9/48* (2006.01)

(52) U.S. Cl.
CPC ........ *G06F 3/04817* (2013.01); *G06F 3/0482* (2013.01); *G06F 3/0485* (2013.01); *G06F 9/4881* (2013.01); *G06T 15/005* (2013.01)

(58) Field of Classification Search
CPC .. G06F 3/04817; G06F 3/0482; G06F 3/0485; G06F 9/4481; G06T 15/005
See application file for complete search history.

(56) References Cited

U.S. PATENT DOCUMENTS

| 9,535,575 B1* | 1/2017 | Labaj | G06F 16/13 |
| 2010/0100841 A1* | 4/2010 | Shin | G06F 3/04817 |
| | | | 715/784 |

OTHER PUBLICATIONS

Open Radar, "Community bug reports", date originated: Jan. 11, 2018, referred herein as OpenRadar, http://www.openradar.me/36436978, accessed via http://www.openradar.me/search?query=WKWebView (Year: 2018).*

* cited by examiner

*Primary Examiner* — Seth A Silverman
(74) *Attorney, Agent, or Firm* — Fountainhead Law Group P.C.

(57) ABSTRACT

Embodiments of the present disclosure pertain to rendering on a mobile device. In one embodiment, a list of widgets to be rendered on a display stored in a priority queue. Widgets in the priority queue are sent to rendering software components based on a specified priority in the queue. The priority is based on whether or not the widgets are in a display area of a display. In one embodiment, data for widgets in the queue is retrieved during rendering of other widgets, and priority is based on whether data for a particular widget in the queue is available.

20 Claims, 6 Drawing Sheets

US 11,023,098 B2

RENDERING ON A MOBILE DEVICE

BACKGROUND

The present disclosure relates to mobile devices, and in particular, to rendering images and data on a mobile device.

Mobile devices have become ubiquitous in modern society. Mobile devices of all sizes, from mobile phones to tablets, have become widely available and commonly used for a variety of applications. As these devices have become more widespread, it has become desirable to run increasingly more powerful programs on these devices. Running programs on mobile devices is sometimes referred to as "edge computing." Typically, software on the mobile device communicates with one or more remote software systems, which sometimes reside in a data center of virtual or physical hardware servers. Remote software, or backend systems, may store large amounts of application data and offer a variety of functional resources.

Bringing the power of backend computer processing and data to a mobile device can be challenging. For instance, bringing data and images on a backend to a mobile device may require that the mobile device store and/or process large amounts of data. However, mobile devices typically only have a fraction of the computing power of backend computer hardware. Discovering techniques for presenting information on a mobile device that is more computationally efficient would help overcome the processing limitations of such devices.

SUMMARY

Embodiments of the present disclosure pertain to rendering on a mobile device. In one embodiment, a list of widgets to be rendered on a display stored in a priority queue. Widgets in the priority queue are sent to rendering software components based on a specified priority in the queue. The priority is based on whether or not the widgets are in a display area of a display. In one embodiment, data for widgets in the queue is retrieved during rendering of other widgets, and priority is based on whether data for a particular widget in the queue is available.

Various embodiments of the techniques described herein may be implemented on a non-transitory machine-readable medium storing a program executable by at least one processing unit of a computer, the program comprising sets of instructions for performing the process steps described herein.

Other embodiments may include a mobile computer system comprising a processor and a non-transitory machine-readable medium storing a program executable by the processor, the program comprising sets of instructions for performing the process steps described herein.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
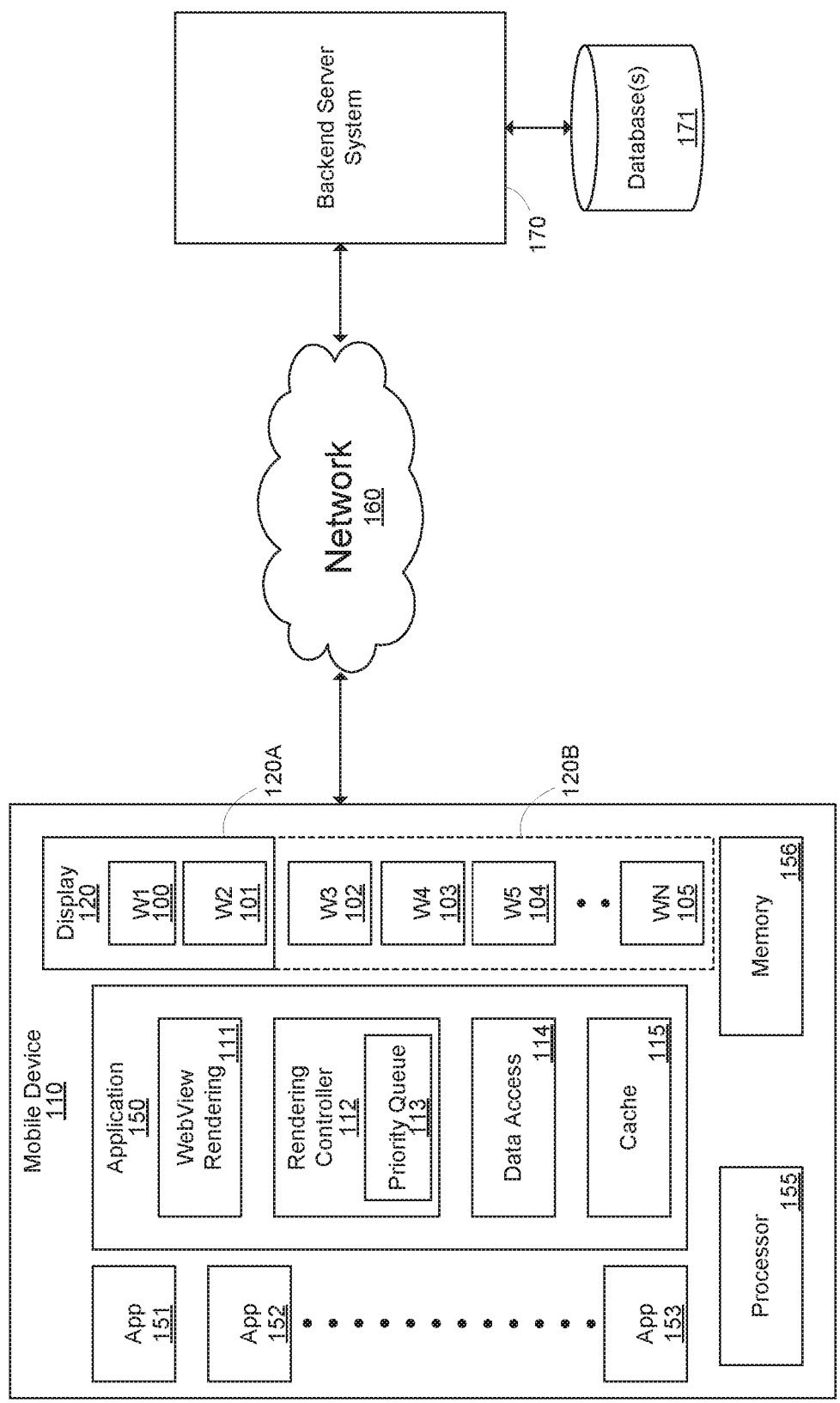
FIG. 1 illustrates a mobile device comprising rendering software according to one embodiment.

FIG. 1 illustrates a mobile device comprising rendering software according to one embodiment. Mobile device 110 may comprise a display 120 for presenting information as well as a processor 155, memory 156 (e.g., random access memory and non-volatile memory), and other typical hardware components such as a network interface (e.g., cellular modem, WiFi, Bluetooth, and the like, not shown). Mobile device 110 may include a number of local applications (e.g., "Apps") 150-153. One or more of applications 150-153 may communicate over one or more networks (illustrated collectively as network 160) to access functionality and resources on a backend software system, such as backend server system 170 and databases 171.

Application 150 may display information in the form of widgets. Downloading and rendering widgets can be computationally intensive. Widgets may include graphics and data, for example, such as charts, tables, graphs and the like, where data for the widgets may be stored on a backend system and accessed over the network, for example. However, accessing and rendering large amounts of data associated with some widgets or a large group of widgets may be computationally intensive and may cause undesirable delays on a mobile device as the widgets are rendered to the display. Features and advantages of the present disclosure include a rendering controller software component 112 having a priority queue 113 for managing the rendering of widgets to reduce memory usage in a mobile device and provide for faster widget rendering response times, in particular when a user scrolls to widgets that are outside of a display, for example.

In this example, application 150 includes a webview rendering software component 111, rendering controller 112 having a priority queue 113, backend data access component 114, and a cache 115. When a user opens application 150, mobile device 110 may receive instructions to render a plurality of widgets (W1-WN) 100-105 (where N is an integer) to be viewable in display 120 of the mobile device. As illustrated in FIG. 1, less than all of the widgets may be viewable in the display at the same time and different widgets may be viewable by scrolling. For example, some widgets may be in a viewable portion 120A of the display 120, while other images may be off the screen in section 120B. In this example, widget W3 102 and other widgets down to widget WN 105 are outside the display 120. A user may scroll to widgets outside the display using a variety of techniques. For example, in a touch screen display, the user may drag a finger across the display to move widgets and other display objects into and out of the display area. A user may similarly scroll using a cursor if the display is controlled by a mechanical device, such as a trackpoint, touchpad, trackball, mouse, or equivalent mechanism for moving a cursor on a display, for example. In one embodiment, a list of widgets to be rendered may be sent to a rendering controller software component 112. In this example, the widgets W1-WN to be rendered may be sent to rendering controller 112. Rendering controller 112 comprises a priority queue 113. The priority queue 113 may be configured to specify a rendering priority for each widget in the list of widgets based on whether or not each particular widget is viewable in the display. In this example, widgets 100 and 101, which are within the display, may be specified in the priority queue 113 to have a higher priority than widgets 102-105, which are outside of the display.

Features and advantages of the present disclosure include sending one or more widgets specified in the priority queue 113 as higher priority to one or more webview rendering components 111 on the mobile device 110. Accordingly, in some embodiments, widgets in the display may receive a higher priority and are rendered before widgets outside the display. In this example, webview rendering software component 111 may send a signal to rendering controller 112 indicating that it has available resources to render a widget. In response, rendering controller 112 may send information for widgets 100 and 101 to rendering component 111 so that available rendering resources are used to render widgets in the display before widgets that are outside the display. Webview rendering component 111 may render widgets for display, for example. In one embodiment, webview rendering component 111 may comprise objects that load and display interactive web content from the backend system, for example. Webview rendering component 111 may access data corresponding to the widgets being rendered (here, W1 and W2) from backend system using a data access software component 114, for example. In one embodiment, data access component 114 may first send a message to cache 115 to determine if the data for a particular widget is already loaded onto the mobile device. If the widget data is in cache 115, then the data is sent from the cache to rendering component 111. However, if the data is not in cache 115, then the mobile device downloads the data from the remote system (e.g., and saves a copy in cache 115).

Advantages of the present disclosure include allowing a user to scroll different widgets into a display and change the order that widgets are rendered. For example, mobile device 110 may receive a scrolling input (e.g., a user swipe), and the scrolling input changes the widgets configured for presentation in the display. For example, a user may scroll to the bottom and bring widget W4 within the display. Accordingly, the rendering priority of widgets in the priority queue is changed. Prior to the scrolling input, widgets W1 and W2 are configured for presentation in the display and widget W4 is not configured for presentation in the display. Accordingly, the priority queue 113 specifies a higher priority for widgets W1 and W2 than widget W4. However, after to the scrolling input, widgets W1 and W2 are not configured for presentation in the display and widget W4 is configured for presentation in the display. Accordingly, the priority queue 113 specifies a higher priority for widget W4 than widgets W1 and W2. Thus, widget W4 is sent to webview rendering component 111 before widgets W1 and W2. Advantageously, in some embodiments, the user may not have to wait for other widgets to render before seeing the widget they may actually want.

Features and advantages of the present disclosure may also include a priority queue further configured to specify a rendering priority for each widget in the list of widgets based on whether or not data corresponding to each particular widget is available in the mobile device. Once the higher priority widgets are sent to rendering component 111 (as described above), data may be accessed from the backend system corresponding to widgets having lower priority. For instance, in this example, widgets W1 and W2 are within display 120, and thus are sent to rendering component 111 first. However, in one embodiment, during the rendering of widgets W1 and W2 by rendering component 111, the system may access data for other widgets in the priority queue. Accordingly, when subsequent widgets in the priority queue are sent for rendering (e.g., after widgets W1 and W2 have finished), the system may have data for the subsequent widgets available (e.g., in cache 115) so that rendering proceeds more quickly. Furthermore, if data requests are sent for widgets W3, W4, and W5, for example, a higher priority may be specified in the priority queue for widgets that have completed their downloads and have data available (e.g., in the cache) and a lower priority may be specified for widgets that may still be in the process of downloading. Data may be accessed, for example, using the data access software component 114, for example. When data corresponding to the lower priority widgets has been loaded onto the mobile device, the priority queue may specify such widgets as higher priority, for example. For instance, when W1 and W2 are sent to rendering component 111, widgets W1 and W2 may be removed from the priority queue. As data access routines are completed for W3, W4, or W5, the priority in the queue may be reset, where widgets with available data are specified as higher priority, for example. When one of the widget being rendered (e.g., W1 or W2) has completed rendering and rendering component 111 is available to render a new widget, the widgets with the higher priority, based on which widget has data available, is sent to rendering component 111.

Figure 2A:
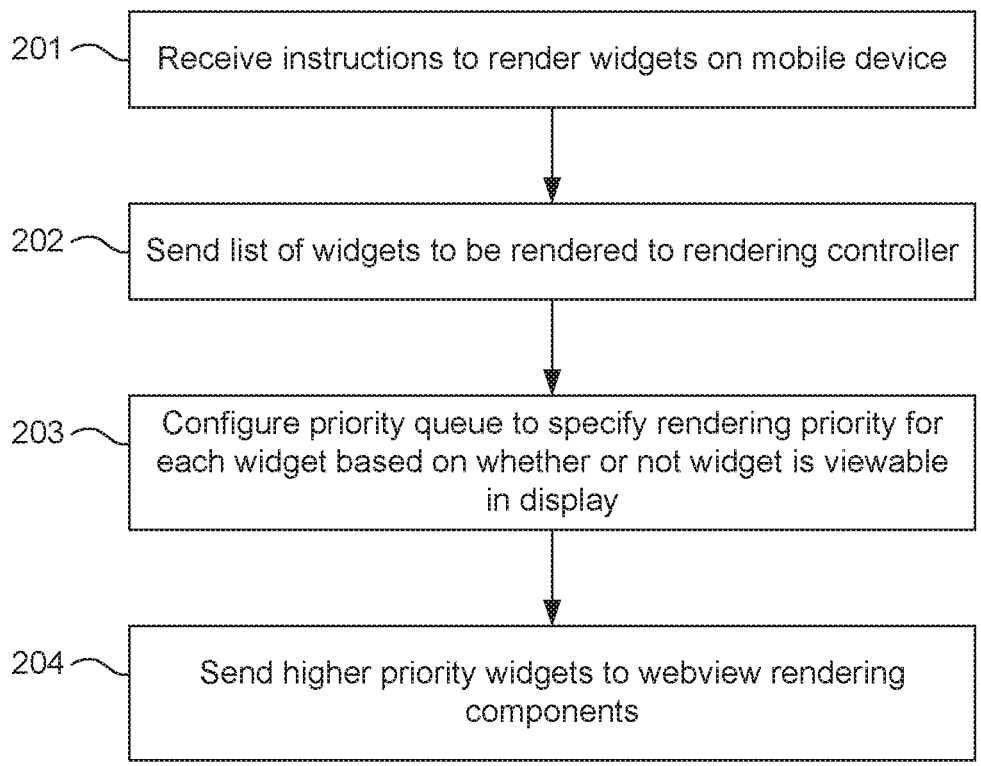
FIG. 2A illustrates a method of rendering on a mobile device according to one embodiment.

FIG. 2A illustrates a method of rendering on a mobile device according to one embodiment. At 201, instructions are received on a mobile device to render a plurality of widgets to be viewable in a display of the mobile device. Less than all of the widgets may be viewable in the display at the same time and different widgets may be viewable by scrolling. The widgets comprise graphics and data, and the data is stored on a backend system accessed over a network, for example. At 202, a list of widgets to be rendered is sent to a rendering controller software component. The rendering controller software component comprises a priority queue, and the priority queue is configured at 203 to specify a rendering priority for each widget in the list of widgets based on whether or not each particular widget is viewable in the display. At 204, one or more first widgets specified in the priority queue as higher priority are sent to one or more webview rendering components on the mobile device. The webview rendering components render widgets for display and access data corresponding to the widgets being rendered from the backend system using a data access software component.

Figure 2B:
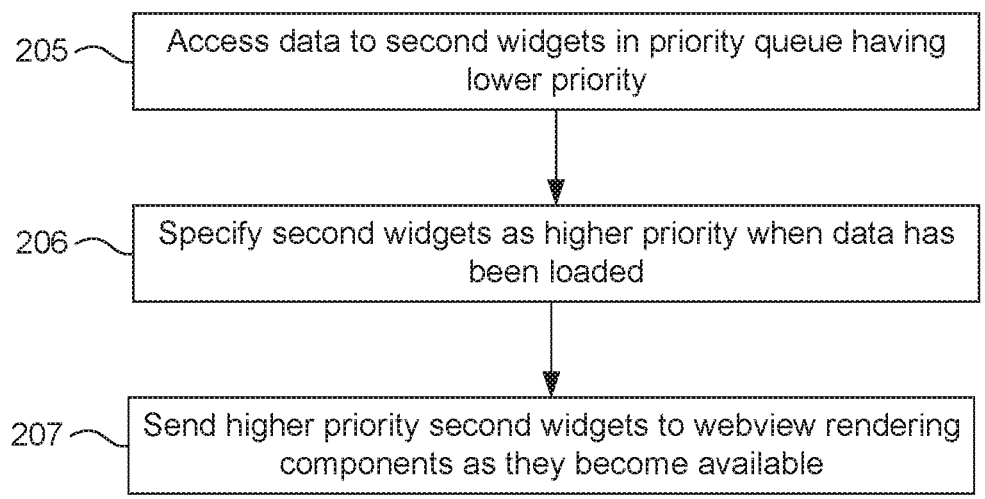
FIG. 2B illustrates a method of rendering on a mobile device according to one embodiment.

FIG. 2B illustrates a method of rendering on a mobile device according to one embodiment. Some embodiments of the present disclosure may access data for widgets during the rendering of other widgets. At 205, data corresponding to a plurality of second widgets having lower priority than the first widgets is accessed from the backend system using the data access software component. At 206, one or more of the second widgets is specified as higher priority when data corresponding to the one or more second widgets has been loaded onto the mobile device. At 207, the second widgets having the higher priority are sent to the one or more webview rendering components when at least one of the first widgets has completed rendering and at least one of the webview rendering components is available to render a new widget.

Figure 3:
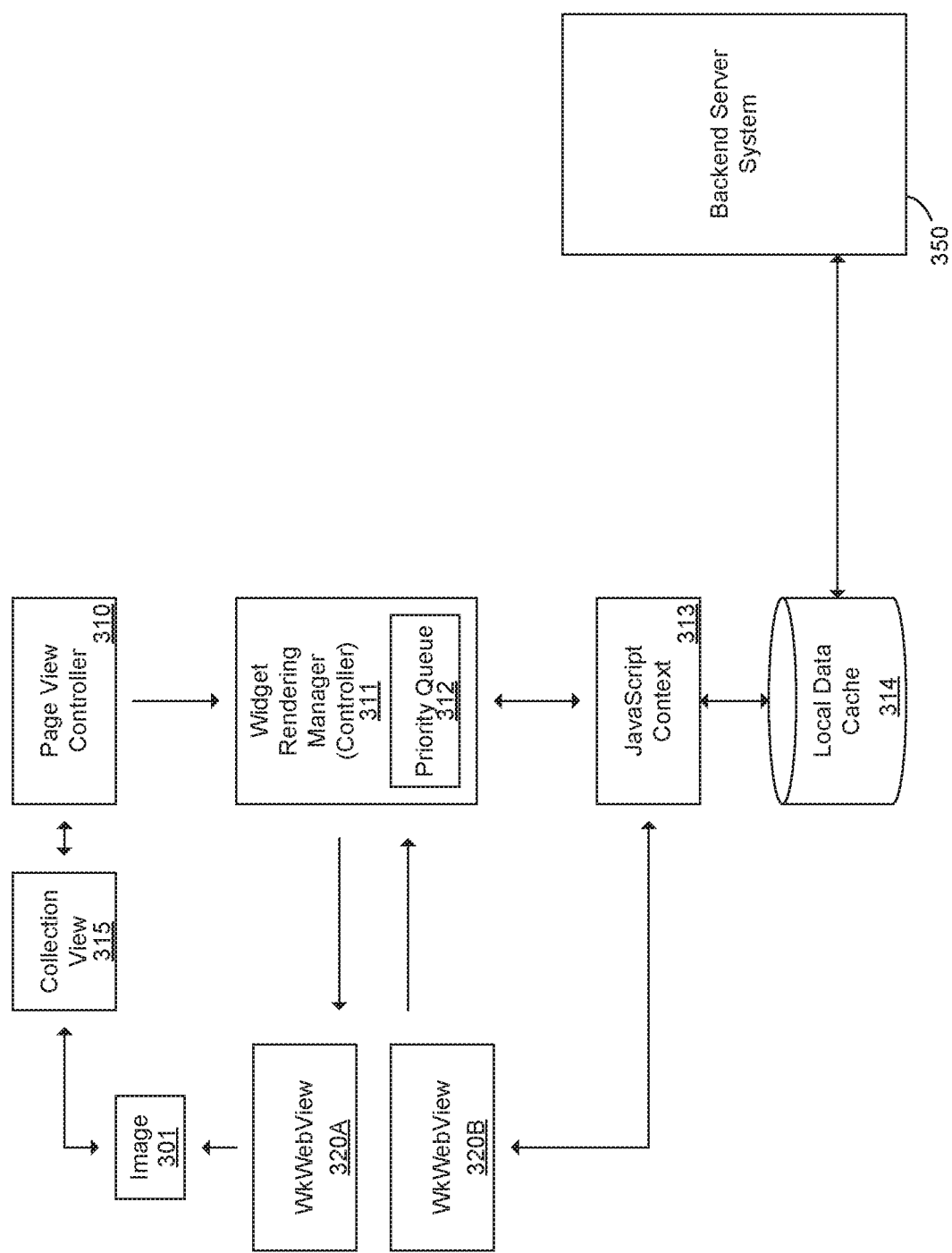
FIG. 3 illustrates an example software architecture for rendering widgets on a mobile device according to one embodiment.

FIG. 3 illustrates an example software architecture for rendering widgets on a mobile device according to one embodiment. When an application is invoked on a mobile device, the application may create a page view controller component 310, widget rendering manager component (controller) 311 including a priority queue 312, a JavaScript context component 313, local data cache 314, rendering components 320A-B, and a collection view 315. In this example, rendering components 320A-B are WkWebView components, for example. Page view controller 310 may determine the widgets to be displayed, for example. In one embodiment, an application may present the user with a plurality of different pages (e.g., a Story), and each page may include a plurality of widgets comprising graphics (e.g., charts) and data (e.g., data presented on the charts). Accordingly, page view controller 310 may determine which widgets are to be rendered and displayed based on a particular story being accessed and the particular page and widgets to be presented, for example. Page view controller 310 may send a list of widgets to be rendered to widget rendering manager 311. In one embodiment, page view controller 310 may pre-render particular widgets to be rendered. Pre-rendering may comprise determining a size of each widget in the list of widgets and a position of each widget in the list of widgets. For example, certain embodiments may determine an initial layout of the widgets to determine which widgets are in a display area and which widgets are outside of the display area. In one embodiment, collection view component 315 may produce a layout and prepare the widgets for display. Collection view 315 may indicate to page view controller 311 that particular widgets are in the display area and that other widgets are not, for example. An example implementation of a collection view 315, page view controller 311 and other components is presented below.

Pre-rendered widgets are sent to widget rendering manager 311 and added to priority queue 312. Next, page view controller 310 may determine, from collection view 315, which widgets are currently visible in the display. Visible widgets are configured to the top of the priority queue 312. In one embodiment, priority queue is an ordered list of pointers in an array pointing to different widget objects, for example, and the pointers are moved around the array (e.g., queue) and associated with different higher or lower priorities, for example. Different widget objects may comprise widget definitions, sizes, chart type, and other attributes of the widget, for example. Higher priority widgets may be placed at the top of the queue and lower priority widgets may be placed below the higher priority widgets in the queue, for example. Different numbers of widgets may have higher priorities based on the number of widgets that appear in the display. For example, in some cases, only two widgets may appear in the screen and have higher priorities, while in other cases, more than two widgets may appear in the screen and have higher priorities.

In this example, the number of WkWebViews available to render the widgets may be limited. Accordingly, all the widgets may not be able to be rendered in parallel. Higher priority widgets are sent to WkWebViews 320A-B for rendering. However, rendering manager 311 may attempt to access data for widgets remaining in priority queue 312 at the same time widgets in the rendering components 320A-B are rendering, for example. In some mobile devices, there may be a limit to the number of backend system calls (e.g., maximum network calls=8) that may be made at any given time without overloading the system. Accordingly, in this example embodiment, rendering components 320A and 320B may issue queries to JavaScript Context component 313 to retrieve data for widgets being rendered, and a plurality of widgets remaining in the queue may simultaneously issue queries to JavaScript Context component 313 to retrieve data, where the total number of queries is limited below a predetermined number so that the number of backend system data downloads does not increase above the predetermined number. JavaScript Context component 313 may be configured to return information required to render the widgets to both the rendering components 320A-B and rendering manager 311, where JavaScript Context component 313 has the ability to open and manage numerous backend system connections simultaneously to access the data for the various widgets, for example.

Figure 4:
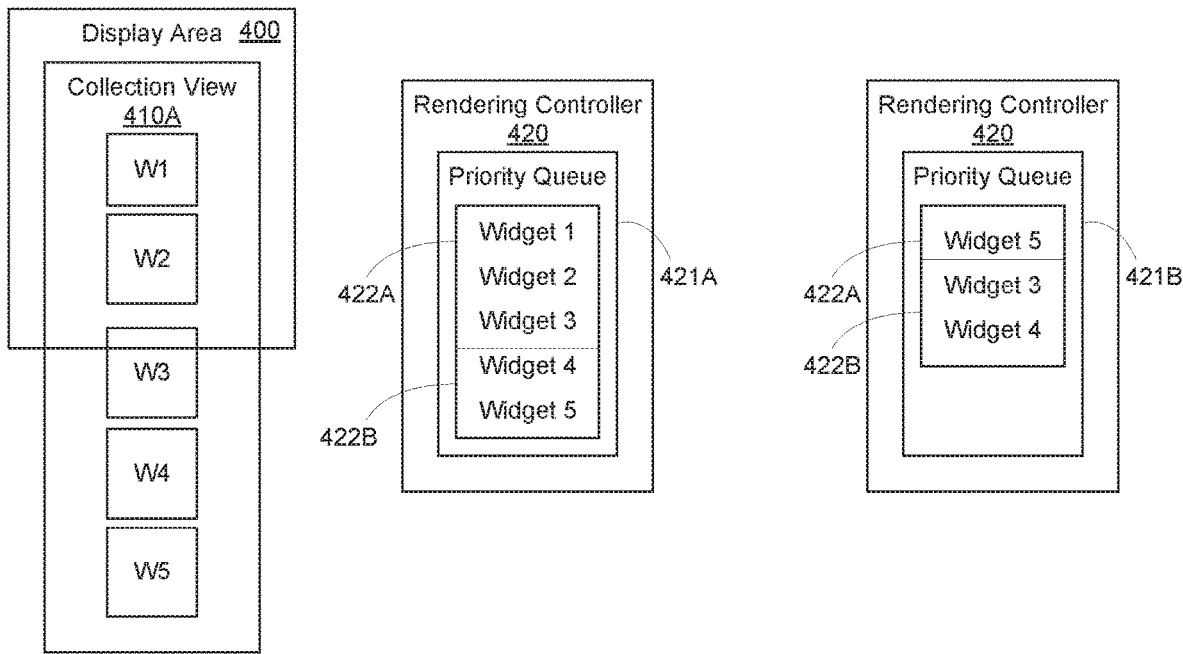
FIG. 4 illustrates a priority queue according to one embodiment.
Figure 5:
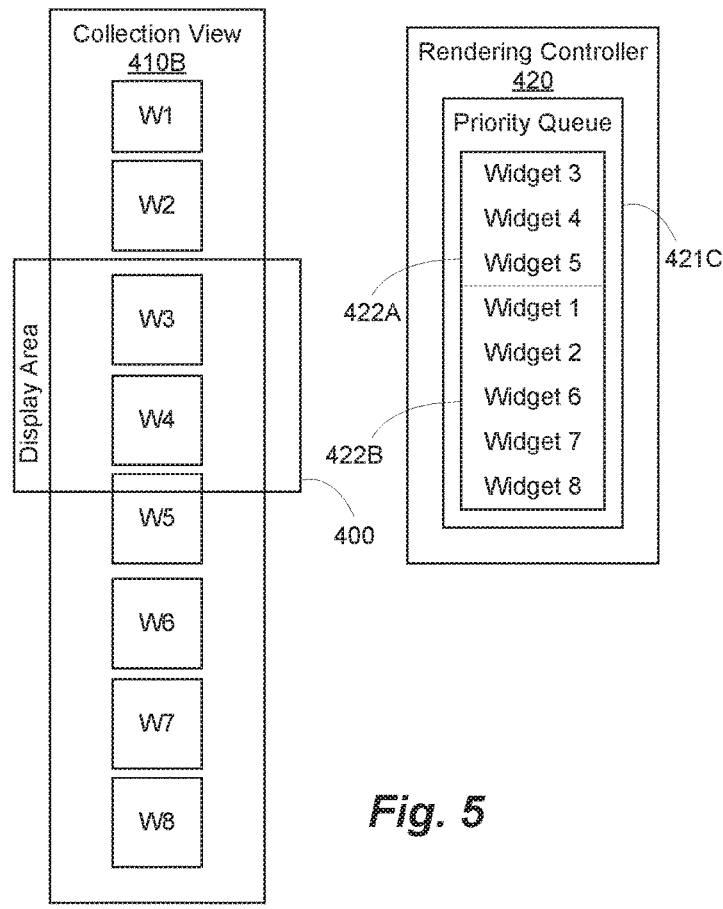
FIG. 5 illustrates a priority queue according to another embodiment.

FIGS. 4-5 illustrate different example priority queues according to various embodiments. In FIG. 4, a collection view 410 may represent how the widgets are positioned relative to a display area 400 of a mobile device. In this example, widgets W1, W2, and part of W3 are in the display area. Accordingly, priority queue 421A in rendering controller 420 has widgets 1-3 at the top of the queue in a high priority section (above the line) 422A, and widgets 4-5 at the bottom of the queue in a lower priority section (below the line) 422B. Thus, in this example, widgets W1 and W2 may be sent to WkWebViews 320A-B first. WkWebViews 320A-B may send queries to JavaScript Context 313 to request data and graphics for the widgets being rendered. JavaScript Context 313 may first attempt to access such information in cache 314, and if the information is not in cache 314, JavaScript Context 313 may open a connection to backend server system 350 to retrieve the information, for example. While W1 and W2 are rendering, widget rendering manager 311 may similarly send queries to JavaScript Context 313 to request data and graphics for some or all of the widgets remaining in the priority queue (e.g., W3, W4, W5). JavaScript Context 313 may first attempt to access such information for widgets W3-5 in cache 314, and if the information is not in cache 314, JavaScript Context 313 may open a connection to backend server system 350 to retrieve the information, for example. However, different widgets may have significantly different amounts of data associated with them. For example, it may take far less time to download the data for widget W5 than for W3 or W4. Accordingly, if widget W5's data is fully downloaded, the widget W5 may be specified as higher priority than widgets W3 and W4, which is illustrated in priority queue 421B where widgets W1 and W2 have been removed and W5 has been moved to the top of the queue because it's data is fully downloaded, for example.

FIG. 5 illustrates another example queue. In this example, collection view 410B includes widgets W1-W9. Here, a user has scrolled down so that widgets W3, W4, and part of W5 are in the display area 400. Thus, priority queue 421C has been modified to specify that W3, W4, and W5 are higher priority than W1, W2, W6-W8, for example.

Referring again to FIG. 3, in one example implementation the components may operate as follows. Page View Controller 310 may comprise an object that contains a Collection View 315 to display a navigation bar, for example. Collection view controller 310 may function to maintain the current state of a user's interaction with a plurality of interactive analytic pages on a backend, such as a cloud for analytics story, for example. The state may comprise one or more of a story definition, page being displayed, and filters being applied to data, for example. The page view controller may function as a bridge between non-UI components and the UI, for example, and may communicate with the widget rendering manager 311. For example, if a user "refreshes" the UI, page view controller may be responsible for updating the state and informing non-UI components on what they may need to do (e.g., Widget Rendering Manager: Stop processing old widgets, update Story definition to the refreshed version of the story definition, etc. . . . ). Depending on the UI transition, the page view controller may send the current widgets on the page to the Widget Rendering Manager to "process" or "queue" or "render", for example, and may send the story and widget definitions to the Collection View Cells upon request.

Collection View 315 may comprise an object that loads a Collection View Layout to determine how to "place" collection view cells (e.g., one list of cells or multiple columns of cells). In one embodiment, the collection view 315 may communicate with the Page View Controller on which collection view cells are visible and which ones are not. The Page View Controller may ask the Collection View which views are visible, coming visible, reload the cells, etc. . . . . In one example implementation there may be only 1 collection view per page view controller. A collection view cell may comprise an individual object representing a part of the Collection View, for example. In some embodiments, a cell will display one widget, and there can be many collection view cells per collection view but only one cell per widget, for example.

JavaScript Context 313 in this example may comprise a non-UI object that loads Java Script libraries, for example. JavaScript Contect 313 may be used to load and run Java Script without the UI, for example. Rendering UI images to the display may occur as follows. When the WKWebviews render the image, they may save the image(s) to a database, for example, and send a notification that a particular widget graphic (e.g., a chart) is ready. The notice may be a "Notify" iOS communication pattern, for example. In this example, object "listens" for a notification named, "notifyChartImageAvailable," and one object sends a message to the notification named, "notifyChartImageAvailable." More specifically, each Collection View Cell (that displays the loading indicator/widget image), "listens" for "notifyChartImageAvailable," and a WkWebView sends a message to the notification named "notifyChartImageAvailable" with the widget Id that was finished being rendered. A Collection View Cell may get the message, check that the received widget Id is the one the Collection View Cell is waiting for, and then take the image from the DB to display. If it's not the same widget Dd, then it ignores the message. In this example, Collection View 315 may contain the Collection View Cells, which listen for the notification that the image is ready (if it was waiting for one). When it gets a notification message, it checks the widget Id of the message. If it's the one it was waiting for then it pulls the image from the DB to display. Collection view controller loads a layout, and upon loading it knows which collection view cells are visible. For visible cells, it tells the page view controller that it needs to know what to load for those cells. The page view controller tells each cell which widget to load and all the state information mentioned above, for example. Upon loading, the collection view may inform the page view controller that it has prepared the layout, and page view can then proceed to pre-render widgets not in the visible area, for example. This pre-render information for off-screen widgets may be sent to the Widget Rendering Manager, for example.

In one example embodiment, widget rendering manager may be used to "warm up" the cache. For example, a user may have a story that has all the widgets that have been rendered previously. If the user opens the story, they see all the widget chart images. In the software, the Page View Controller tells the Widget Rendering Manager (WRM) to send queries for all the widgets on the page. It's added to the queue to render but without UI information. No UI Information may prevent the WRM from doing anything else after the query results returns. The WRM may runs through the queue in order and sends out the data requests (e.g., with the network restrictions mentioned above). No WKWebView workflow is initiated or started in this case. Accordingly, the above workflow may help update the Local Data Cache with the latest data without the user needing to do anything and no UI needed to trigger the workflow.

Figure 6:
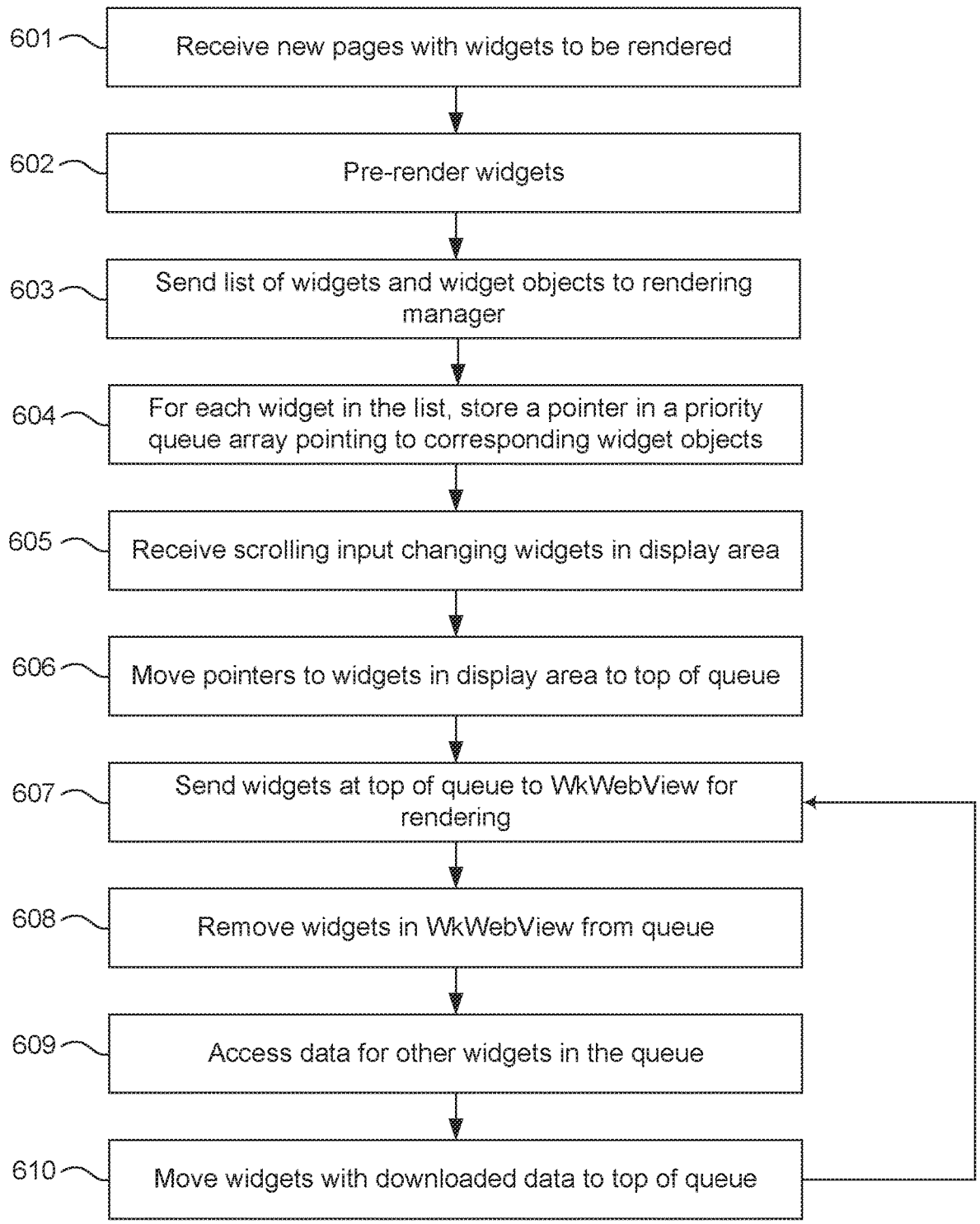
FIG. 6 illustrates an example method of rendering software on a mobile device according to one embodiment.

FIG. 6 illustrates an example method of rendering software on a mobile device according to one embodiment. At 601, new pages are received in an application with widgets to be rendered. At 602, the widgets may be pre-rendered to determine a position in each widget relative to a display area. At 603, a list of widgets and widget objects including widget definitions (e.g., widget metadata) in a particular page may be sent to a rendering manager. At 604, for each widget in the list, a pointer is stored in a priority queue array pointing to corresponding widget objects. At 605, a scrolling input is received changing widgets in a display area of the display. At 606, pointers to widgets in the display area are moved to the top of the priority queue. At 607, widgets at the top of the queue are sent to a WkWebView for rendering. At 608, widgets sent to WkWebView are removed from the queue. At 609, data is accessed for other widgets in the queue. At 610, widgets that have completed their data downloads are moved to the top of the queue. The process may then repeat steps 607 until all widgets are rendered, for example.

Figure 7:
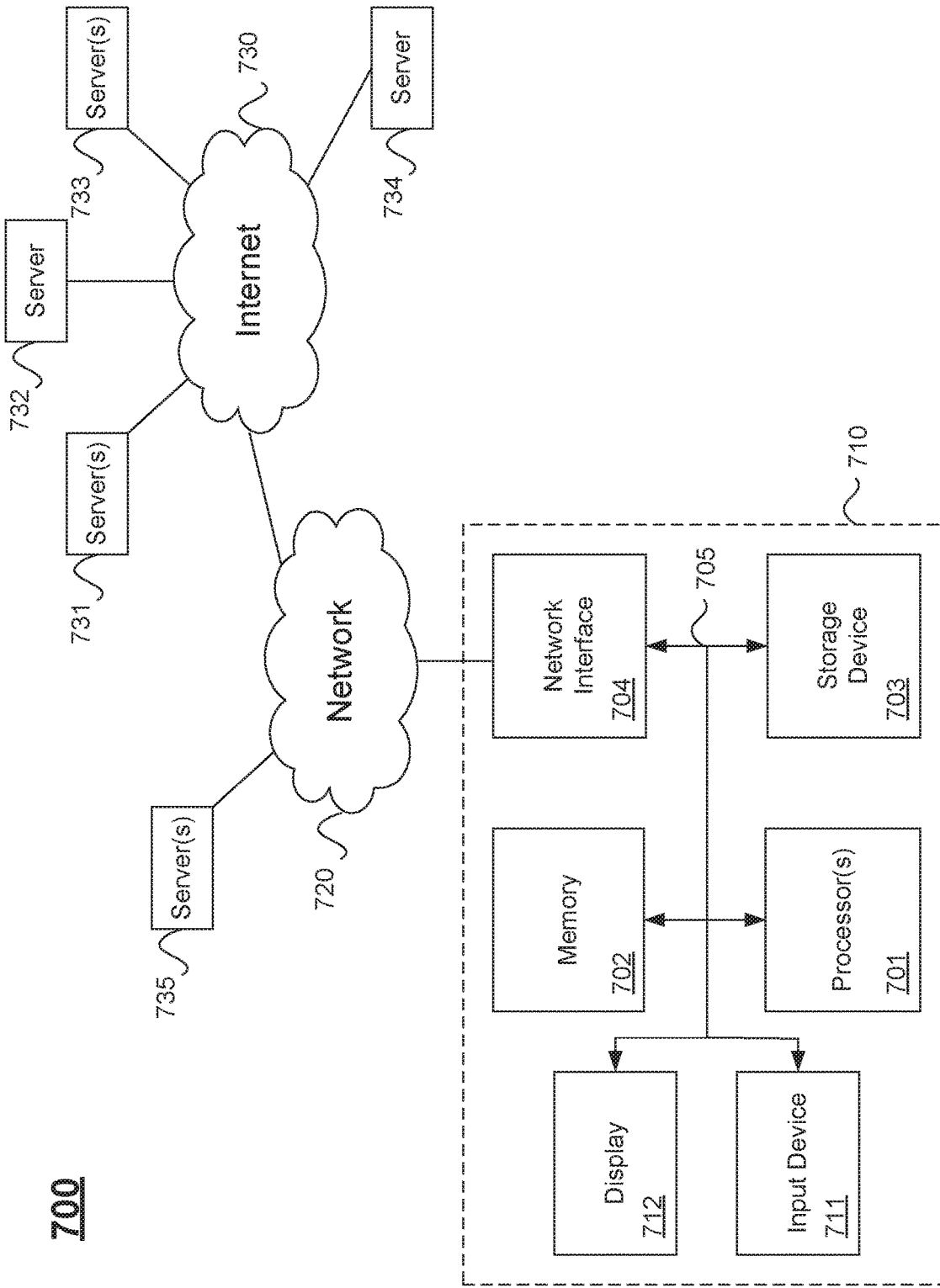
FIG. 7 illustrates computer system hardware configured according to the disclosure.

FIG. 7 illustrates computer system hardware configured according to the above disclosure. The following hardware description is merely one illustrative example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701. Memory 702 may also be used for storing programs executed by processor(s) 701. Possible implementations of memory 702 may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device 703 and memory 702 are both examples of non-transitory computer readable storage mediums.

Computer system 710 may be coupled via bus 705 to a display 712 for displaying information to a computer user. An input device 711 such as a keyboard, touchscreen, mouse and/or camera is coupled to bus 705 for communicating information and command selections from the user to processor 701. The combination of these components allows the user to communicate information with the system. In some systems, bus 705 represents multiple specialized buses for coupling various components of the computer together, for example.

Computer system 710 also includes a network interface 704 coupled with bus 705. Network interface 704 may provide two-way data communication between computer system 710 and a local network 720. Network 720 may represent one or multiple networking technologies, such as Ethernet, local wireless networks (e.g., WiFi), or cellular networks, for example. The network interface 704 may be a wireless or wired connection, for example. Computer system 710 can send and receive information through the network interface 704 across a wired or wireless local area network, an Intranet, or a cellular network to the Internet 730, for example. In some embodiments, a browser or local application, for example, may access data and features on backend software systems that may reside on multiple different hardware servers on-prem 735 or across the Internet 730 on servers 731-734. One or more of servers 731-734 may also reside in a cloud computing environment, for example. Such servers may also comprise hardware such as memory, one or more processors, storage devices, and a network interface similar to computer 710, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
receiving, on a mobile device, instructions to render a plurality of widgets to be viewable in a display of the mobile device, wherein less than all of the widgets are viewable in the display at the same time and different widgets are viewable by scrolling, the widgets including one or more first widgets viewable in the display and one or more second widgets outside of the display, the widgets comprising graphics and data, wherein the data is stored on a backend system accessed over a network;
sending, on the mobile device, a list of widgets to be rendered to a rendering controller software component, the list of widgets including the one or more first widgets viewable and the one or more second widgets, the rendering controller software component comprising a priority queue, wherein the priority queue is configured to specify a rendering priority for each widget in the list of widgets based on whether or not each particular widget is viewable in the display, the one or more first widgets viewable in the display being specified in the priority queue to have higher priority than the one or more second widgets outside of the display;
sending the one or more first widgets specified in the priority queue as higher priority to one or more webview rendering components on the mobile device, the webview rendering components rendering the first widgets for display and accessing data corresponding to the first widgets being rendered from the backend system using a data access software component;
accessing, during the rendering of the first widgets by the one or more webview rendering components, data corresponding to the second widgets having lower priority than the first widgets from the backend system using the data access software component;
specifying one or more of the second widgets as higher priority than other widgets of the second widgets when data corresponding to the one or more second widgets has been downloaded onto the mobile device and data corresponding to the other second widgets is being downloaded; and
sending the one or more second widgets having the higher priority to the one or more webview rendering components when at least one of the first widgets has completed rendering and at least one of the webview rendering components is available to render a new widget.

2. The method of claim 1 further comprising:
receiving a scrolling input in the mobile device, the scrolling input changing the widgets configured for presentation in the display; and
changing the rendering priority of a plurality of widgets in the list of widgets,
wherein, prior to the scrolling input, a first widget is configured for presentation in the display and a second widget is not configured for presentation in the display, and wherein the priority queue specifies a higher priority for the first widget than the second widget, and
wherein, after to the scrolling input, the first widget is not configured for presentation in the display and the second widget is configured for presentation in the display, and wherein the priority queue specifies a higher priority for the second widget than the first widget.

3. The method of claim 1 wherein the webview rendering components are objects that load and display interactive web content from the backend system.

4. The method of claim 3 wherein the webview rendering components are WkWebView objects.

5. The method of claim 1 further comprising, before said step of sending the list of widgets, pre-rendering the widgets, wherein pre-rendering comprises determining a size of each widget in the list of widgets and a position of each widget in the list of widgets.

6. The method of claim 1 wherein the priority queue comprises an array of pointers, wherein the pointers point to widget objects comprising information about each of the widgets in the list of widgets.

7. The method of claim 1 wherein the priority queue is an ordered list of widgets.

8. The method of claim 1 wherein the accessing, during the rendering of the first widgets by the one or more webview rendering components, of the data corresponding to the second widgets from the backend system using the data access software component comprises issuing queries for each of the second widgets to a JavaScript Context component to retrieve the data corresponding to the second widgets from the backend system, the issuing of the queries for each of the second widgets being simultaneous with the accessing of the data corresponding to the first widgets.

9. A non-transitory machine-readable medium storing a program executable by at least one processing unit of a computer, the program comprising sets of instructions for:

receiving, on a mobile device, instructions to render a plurality of widgets to be viewable in a display of the mobile device, wherein less than all of the widgets are viewable in the display at the same time and different widgets are viewable by scrolling, the widgets comprising graphics and data, wherein the data is stored on a backend system accessed over a network;

sending, on the mobile device, a list of widgets to be rendered to a rendering controller software component, the list of widgets including one or more first widgets viewable in the display and one or more second widgets outside of the display, the rendering controller software component comprising a priority queue, wherein the priority queue is configured to specify a rendering priority for each widget in the list of widgets based on whether or not each particular widget is viewable in the display, wherein the priority queue is further configured to specify a rendering priority for each widget in the list of widgets based on whether or not data corresponding to each particular widget is available in the mobile device, each of the one or more first widgets viewable in the display being specified in the priority queue to have higher priority than each of the one or more second widgets outside of the display;

sending the one or more first widgets specified in the priority queue as higher priority to one or more webview rendering components on the mobile device, the webview rendering components rendering the first widgets for display and accessing data corresponding to the first widgets being rendered from the backend system using a data access software component; and accessing, during the rendering of the first widgets by the one or more webview rendering components, data corresponding to the second widgets having lower priority than the first widgets from the backend system using the data access software component;

specifying one or more of the second widgets as higher priority than other widgets of the second widgets when data corresponding to the one or more second widgets has been downloaded onto the mobile device and data corresponding to the other second widgets is being downloaded; and sending the one or more second widgets having the higher priority to the one or more webview rendering components when at least one of the first widgets has completed rendering and at least one of the webview rendering components is available to render a new widget.

10. The non-transitory machine-readable medium of claim 9 further comprising:

receiving a scrolling input in the mobile device, the scrolling input changing the widgets configured for presentation in the display; and changing the rendering priority of a plurality of widgets in the list of widgets, wherein, prior to the scrolling input, a first widget is configured for presentation in the display and a second widget is not configured for presentation in the display, and wherein the priority queue specifies a higher priority for the first widget than the second widget, and wherein, after to the scrolling input, the first widget is not configured for presentation in the display and the second widget is configured for presentation in the display, and wherein the priority queue specifies a higher priority for the second widget than the first widget.

11. The non-transitory machine-readable medium of claim 9 wherein the webview rendering components are objects that load and display interactive web content from the backend system.

12. The non-transitory machine-readable medium of claim 9 further comprising, before said step of sending the list of widgets, pre-rendering the widgets, wherein pre-rendering comprises determining a size of each widget in the list of widgets and a position of each widget in the list of widgets.

13. The non-transitory machine-readable medium of claim 9 wherein the priority queue is an ordered list of widgets.

14. The non-transitory machine-readable medium of claim 9 wherein the accessing, during the rendering of the first widgets by the one or more webview rendering components, of the data corresponding to the second widgets from the backend system using the data access software component comprises issuing queries for each of the second widgets to a JavaScript Context component to retrieve the data corresponding to the second widgets from the backend system, the issuing of the queries for each of the second widgets being simultaneous with the accessing of the data corresponding to the first widgets.

15. A mobile computer system comprising:
a processor; and
a non-transitory machine-readable medium storing a program executable by the processor, the program comprising sets of instructions for:

receiving, on a mobile device, instructions to render a plurality of widgets to be viewable in a display of the mobile device, wherein less than all of the widgets are viewable in the display at the same time and different widgets are viewable by scrolling, the widgets comprising graphics and data, wherein the data is stored on a backend system accessed over a network;

sending, on the mobile device, a list of widgets to be rendered to a rendering controller software component, the list of widgets to be rendered including one or more first widgets viewable in the display and one or more second widgets outside of the display, the rendering controller software component comprising a priority queue, wherein the priority queue is configured to specify a rendering priority for each widget in the list of widgets based on whether or not each particular widget is viewable in the display, wherein the priority queue is further configured to specify a rendering priority for each widget in the list of widgets based on whether or not data corresponding to each particular widget is available in the mobile device, each of the one or more first widgets viewable in the display being specified in the priority queue to have higher priority than each of the one or more second widgets outside of the display;

sending the one or more first widgets specified in the priority queue as higher priority to one or more webview rendering components on the mobile device, the webview rendering components rendering the first widgets for display and accessing data corresponding to the first widgets being rendered from the backend system using a data access software component; and accessing, during the rendering of the first widgets by the one or more webview rendering components, data corresponding to the second widgets having lower priority than the first widgets from the backend system using the data access software component;

specifying one or more of the second widgets as higher priority than other widgets of the second widgets when data corresponding to the one or more second widgets has been downloaded onto the mobile device and data corresponding to the other second widgets is being downloaded; and sending the one or more second widgets having the higher priority to the one or more webview rendering components when at least one of the first widgets has completed rendering and at least one of the webview rendering components is available to render a new widget.

16. The mobile computer system of claim 15 further comprising:

receiving a scrolling input in the mobile device, the scrolling input changing the widgets configured for presentation in the display; and changing the rendering priority of a plurality of widgets in the list of widgets, wherein, prior to the scrolling input, a first widget is configured for presentation in the display and a second widget is not configured for presentation in the display, and wherein the priority queue specifies a higher priority for the first widget than the second widget, and wherein, after to the scrolling input, the first widget is not configured for presentation in the display and the second widget is configured for presentation in the display, and wherein the priority queue specifies a higher priority for the second widget than the first widget.

17. The mobile computer system of claim 15 wherein the webview rendering components are objects that load and display interactive web content from the backend system.

18. The mobile computer system of claim 15 further comprising, before said step of sending the list of widgets, pre-rendering the widgets, wherein pre-rendering comprises determining a size of each widget in the list of widgets and a position of each widget in the list of widgets.

19. The mobile computer system of claim 15 wherein the priority queue is an ordered list of widgets.

20. The mobile computer system of claim 15 wherein the accessing, during the rendering of the first widgets by the one or more webview rendering components, of the data corresponding to the second widgets from the backend system using the data access software component comprises issuing queries for each of the second widgets to a JavaScript Context component to retrieve the data corresponding to the second widgets from the backend system, the issuing of the queries for each of the second widgets being simultaneous with the accessing of the data corresponding to the first widgets.

* * * * *